US012730207B2

(12) United States Patent
Park et al.

(10) Patent No.: US 12,730,207 B2
(45) Date of Patent: Sep. 8, 2026

(54) PULSE RADAR DEVICE AND OPERATING METHOD THEREOF

(71) Applicant: ELECTRONICS AND TELECOMMUNICATIONS RESEARCH INSTITUTE, Daejeon (KR)

(72) Inventors: Pil Jae Park, Daejeon (KR); Seong Mo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 349 days.

(21) Appl. No.: 18/480,847

(22) Filed: Oct. 4, 2023

(65) Prior Publication Data

US 2024/0125911 A1 Apr. 18, 2024

(30) Foreign Application Priority Data

Oct. 14, 2022 (KR) ........................ 10-2022-0132533
Jun. 1, 2023 (KR) ........................ 10-2023-0070678

(51) Int. Cl.
*G01S 13/42* (2006.01)
*G01S 7/40* (2006.01)
*G01S 13/76* (2006.01)

(52) U.S. Cl.
CPC .......... *G01S 13/428* (2013.01); *G01S 7/4065* (2021.05); *G01S 13/76* (2013.01)

(58) Field of Classification Search
CPC .......... G01S 13/76; G01S 7/292; G01S 7/288; G01S 7/4065
See application file for complete search history.

(56) References Cited

U.S. PATENT DOCUMENTS 10,705,183 B2 7/2020 Huang et al.
11,520,005 B2 12/2022 Park et al.
(Continued)

FOREIGN PATENT DOCUMENTS

CN 206863217 U * 1/2018
JP 2010230519 A * 10/2010
(Continued)

OTHER PUBLICATIONS

Machine translation of JP 2010230519 A (Year: 2010).*
(Continued)

*Primary Examiner* — Vladimir Magloire
*Assistant Examiner* — Anna K. Gosling
(74) *Attorney, Agent, or Firm* — Rabin & Berdo, P.C.

(57) ABSTRACT

The present disclosure relates to a pulse radar device comprising a memory that includes a first memory and a second memory, each storing a scan vector. The device also includes a clock generator that produces a transmission clock signal and a reception clock signal. The reception clock signal is generated by delaying the transmission clock signal by a clock delay value. Furthermore, the device includes a transmitter that generates a transmission pulse by accepting the transmission clock signal from the clock generator and emits the pulse. Additionally, the device includes a receiver that receives an echo pulse reflected from a target by accepting the reception clock signal from the clock generator. The receiver then calculates the received echo pulse to generate a representative scan vector.

11 Claims, 12 Drawing Sheets

(56) References Cited

U.S. PATENT DOCUMENTS

2002/0097592 A1* 7/2002 Komurasaki ......... H03L 7/0995
363/157
2014/0354469 A1 12/2014 Park et al.
2021/0239790 A1* 8/2021 Park ...................... G01S 7/2926

FOREIGN PATENT DOCUMENTS

KR 10-1656705 B1 9/2016
KR 20210097452 A 8/2021

OTHER PUBLICATIONS

Machine translation of CN-206863217-U (Year: 2018).*
V. Jain, S. Sundararaman and P. Heydari, "A 22ă29-GHz UWB Pulse-Radar Receiver Front-End in 0.18- I¼m CMOS," in IEEE Transactions on Microwave Theory and Techniques, vol. 57, No. 8, pp. 1903-1914, Aug. 2009, doi: 10.1109/TMTT.2009.2025420 (Year: 2009).*

* cited by examiner

FIG. 8B

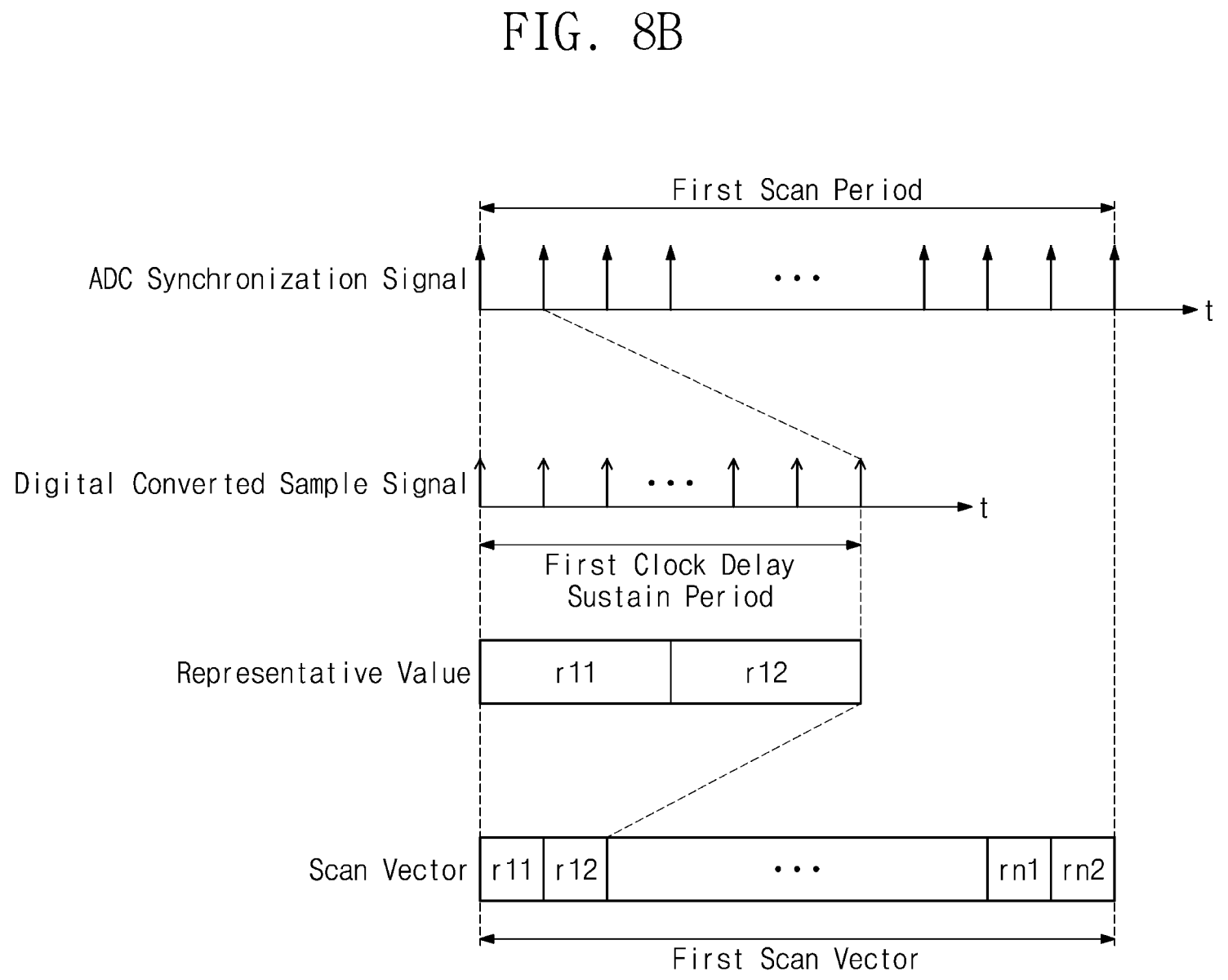

First Scan Period

ADC Synchronization Signal

Digital Converted Sample Signal

First Clock Delay
Sustain Period

Representative Value r11 r12

Scan Vector r11 r12 rn1 rn2

First Scan Vector t t

Figure 14:
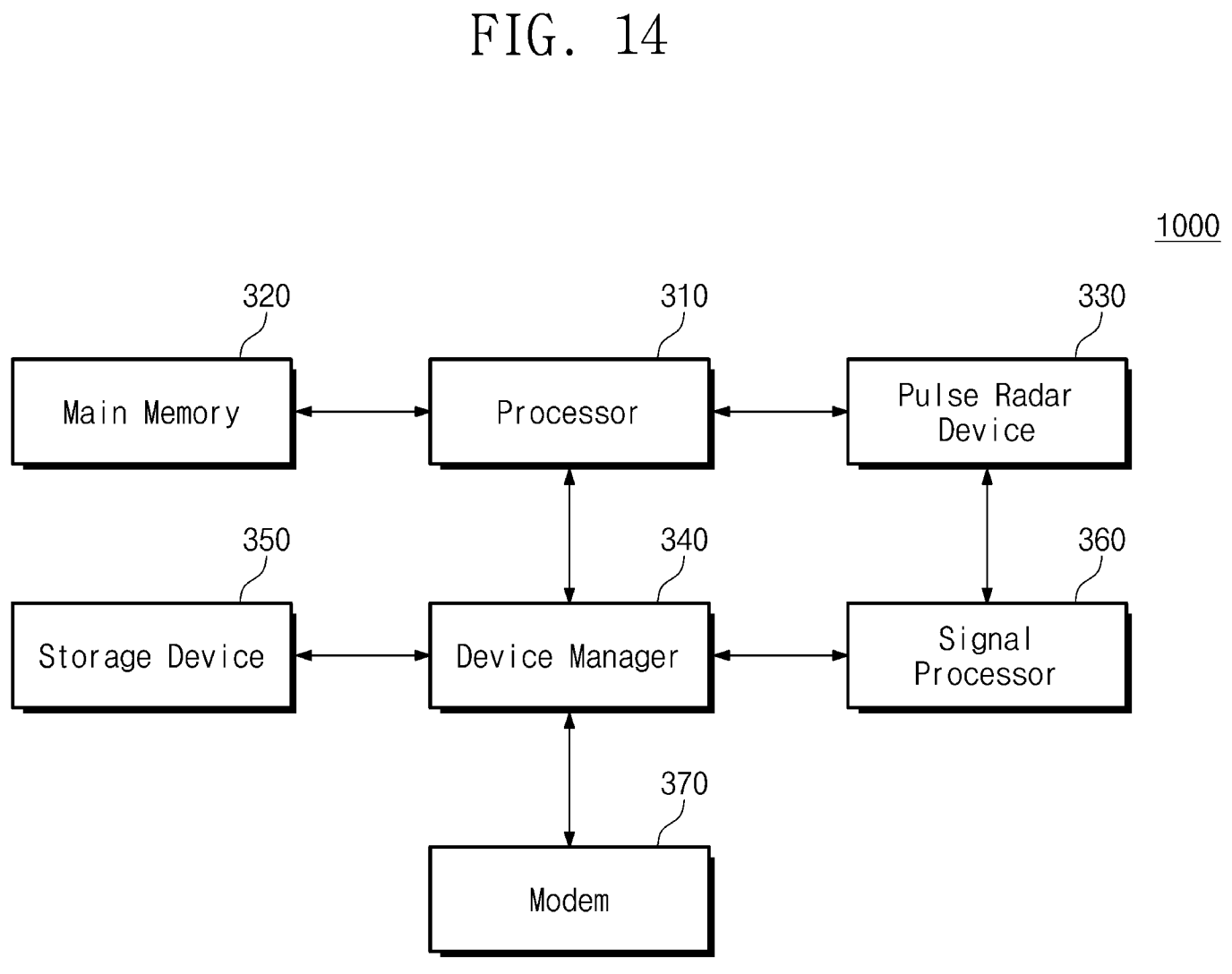

330 Pulse Radar Device

360 Signal Processor

310 Processor

340 Device Manager

370 Modem

320 Main Memory

350 Storage Device

PULSE RADAR DEVICE AND OPERATING METHOD THEREOF

CROSS-REFERENCE TO RELATED APPLICATIONS

This application claims priority under 35 U.S.C. § 119 to Korean Patent Application No. 10-2022-0132533 filed on Oct. 14, 2022, and Korean Patent Application No. 10-2023-0070678 filed on Jun. 1, 2023, in the Korean Intellectual Property Office, the disclosures of which are incorporated by reference herein in their entireties.

BACKGROUND

Embodiments of the present disclosure described herein relate to a pulse radar device and an operating method thereof, and more particularly, relate to a pulse radar device capable of processing received data and an operating method thereof.

A pulse radar device using a pulse as a transmission signal repeatedly transmits a transmission pulse (Tx Pulse). A receiver of the pulse radar device obtains information on the target by receiving an echo pulse (or an echo signal) obtained by the transmission pulse being reflected from the target.

The pulse radar device operates based on a clock signal. In detail, a transmitter of a pulse radar device based on a clock signal uses a transmission clock signal to radiate a transmission pulse through a transmission antenna. The receiver of the pulse radar device uses a reception clock signal to receive the echo pulse obtained by the transmission pulse being reflected from the target.

When the pulse radar device obtains target information using the echo pulse, it is necessary to increase the signal-to-noise ratio of the received signal. Specially, when processing the echo pulse, it becomes necessary to employ a method that preserves the target information contained within the echo pulse while simultaneously reducing the storage space by minimizing the number of received data samples.

SUMMARY

Embodiments of the present disclosure provide a pulse radar device capable of processing received data and an operating method thereof.

In an embodiment of the present disclosure, a pulse radar device includes a memory including a first memory and a second memory each storing one scan vector. The pulse radar device includes a clock generator that outputs a transmission clock signal and outputs a reception clock signal by delaying the transmission clock signal by a clock delay value. The pulse radar device includes a transmitter that generates a transmission pulse by receiving the transmission clock signal from the clock generator and radiates the transmission pulse. The pulse radar device includes a receiver that receives an echo pulse reflected from a target by accepting the reception clock signal from the clock generator. Through calculations performed on the received echo pulse, the receiver generates a representative scan vector. The receiver includes an analog to digital converter that converts the received echo pulse into a plurality of digital sample signals. The receiver includes an operator that converts the digital sample signals into representative values at each clock delay value and generates the representative scan vector from the representative values at the each clock delay value.

In an embodiment of the present disclosure, an operational method for a pulse radar device is provided, which comprises a first memory and a second memory, each storing a scan vector. The method involves emitting a transmission pulse towards a target using a transmission clock signal, receiving an echo pulse that is reflected from the target using a reception clock signal obtained by introducing a clock delay value to the transmission clock signal, and generating a representative scan vector by performing calculations on the received echo pulse. The clock delay value is determined within the range of a minimum clock delay value and a maximum clock delay value. The process of generating the representative scan vector by calculating the received echo pulse involves several steps. These steps include converting the received echo pulse, corresponding to a scan period, into multiple digital sample signals, further converting these digital sample signals into representative values corresponding to each clock delay value, generating at least one scan vector using the representative values at the each clock delay value, and finally constructing the representative scan vector based on the generated scan vectors.

BRIEF DESCRIPTION OF THE FIGURES

The above and other objects and features of the present disclosure will become apparent by describing in detail embodiments thereof with reference to the accompanying drawings.

FIGS. 8A and 8B illustrate a process of generating a scan vector, according to an embodiment of the present disclosure.

FIG. 14 is a block diagram illustrating a computing device including a pulse radar device, according to an embodiment of the present disclosure.

DETAILED DESCRIPTION

Hereinafter, embodiments of the present disclosure may be described in detail and clearly to such an extent that an ordinary one in the art easily implements the present disclosure.

Figure 1:
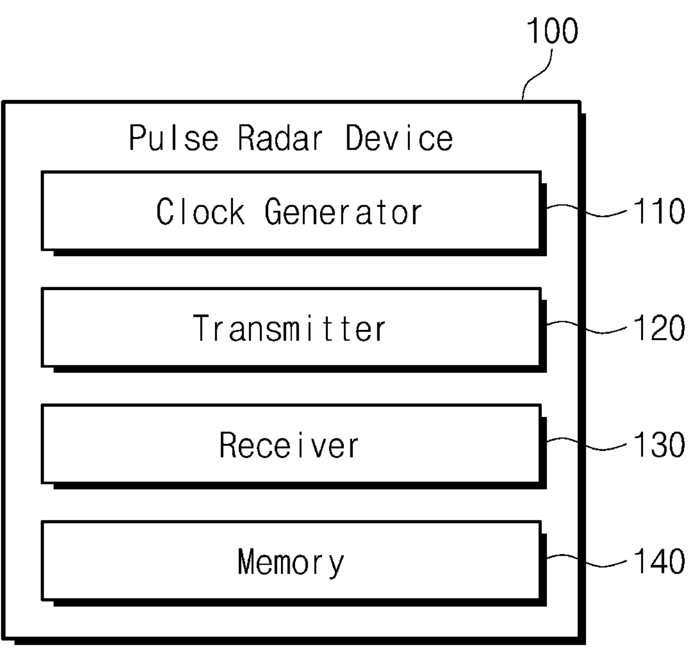
FIG. 1 is a block diagram illustrating a pulse radar device, according to an embodiment of the present disclosure.

FIG. 1 is a block diagram illustrating a pulse radar device 100, according to an embodiment of the present disclosure. Referring to FIG. 1, a pulse radar device 100 may include a clock generator 110, at least one transmitter 120, at least one receiver 130, and a memory 140.

The clock generator 110 may output a transmission clock signal and a reception clock signal. For example, the clock generator 110 may output the transmission clock signal to the transmitter 120. After outputting the transmission clock signal, the clock generator 110 may delay the transmission clock signal by a transmission and reception clock (TRX) delay value (hereinafter referred to as a clock delay value). Subsequently, the clock generator 110 outputs the reception clock signal to the receiver 130.

The clock generator 110 may output the reception clock signal by varying the clock delay value. The clock delay value may correspond to a scan distance (or detection distance) of the pulse radar device 100. In detail, when the clock delay values are the same, the pulse radar device 100 may scan the same scan distance, and when the clock delay values are different, the pulse radar device 100 may scan different scan distances.

The transmitter 120 may accept the transmission clock signal and may generate a transmission pulse based on the accepted transmission clock signal. The transmitter 120 may radiate the transmission pulse to a target through a transmission antenna.

The receiver 130 may accept the reception clock signal and may receive the echo pulse based on the accepted reception clock signal. For example, according to the reception clock signal, the receiver 130 may receive the echo pulse originated from the transmission pulse being reflected off the target through the reception antenna.

The receiver 130 may obtain target information included in the received echo pulse by calculating the received echo pulse. In this case, the target information may be location information of the target, speed information of the target, etc.

For example, the receiver 130 may generate a scan vector by calculating the received echo pulse. The receiver 130 may obtain target information from the scan vector.

The memory 140 may store a result calculated from the receiver 130. For example, the memory 140 may store the scan vector generated by the receiver 130. In this case, the memory 140 may have a size to store two scan vectors.

As described above, the pulse radar device 100 may repeatedly change the scan distance from minimum to maximum by varying the clock delay value. In detail, the pulse radar device 100 may repeatedly scan a target by changing a scan distance.

Figure 2:
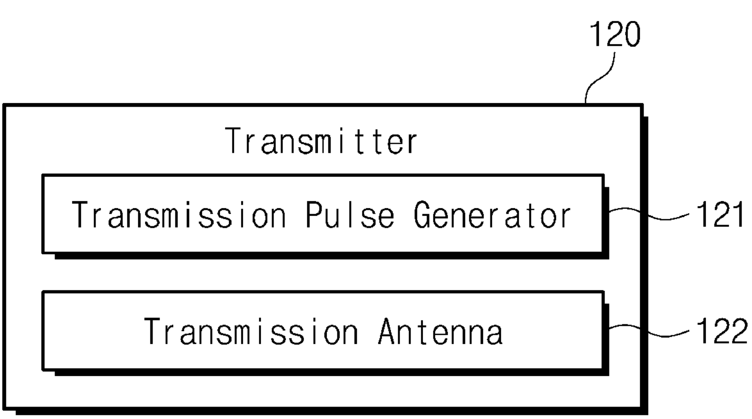
FIG. 2 is a block diagram illustrating a transmitter of FIG. 1.

FIG. 2 is a block diagram illustrating the transmitter 120 of FIG. 1. Referring to FIGS. 1 and 2, the transmitter 120 may include a transmission pulse generator 121 and a transmission antenna 122.

The transmission pulse generator 121 may generate a transmission pulse based on the transmission clock signal. For example, the transmission pulse generator 121 may accept the transmission clock signal from the clock generator 110 and may generate the transmission pulse based on the accepted transmission clock signal.

The transmission antenna 122 may radiate the transmission pulse. For example, the transmission antenna 122 may radiate the transmission pulse generated by the transmission pulse generator 121 to a target.

Figure 3:
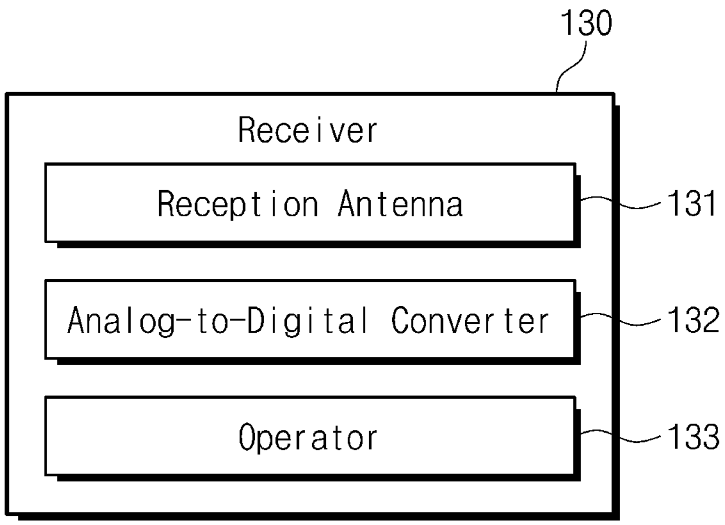
FIG. 3 is a block diagram illustrating a receiver of FIG. 1.

FIG. 3 is a block diagram illustrating the receiver 130 of FIG. 1. Referring to FIGS. 1 and 3, the receiver 130 may include a reception antenna 131, an analog-to-digital converter 132, and an operator 133.

The reception antenna 131 may receive the echo pulse reflected from a target. For example, the reception antenna 131 may accept the reception clock signal from the clock generator 110 and may receive the echo pulse based on the reception clock signal.

The analog-to-digital converter 132 may convert the received echo pulse into a digital signal. For example, the analog-to-digital converter 132 may convert the received echo pulse into a plurality of digital sample signals.

The analog-to-digital converter 132 may convert the received echo pulse corresponding to the same scan distance into the plurality of digital sample signals. For example, the analog-to-digital converter 132 may convert the received echo pulse having the same clock delay value into the plurality of digital sample signals.

The operator 133 may convert the plurality of digital sample signals into at least one representative value. The operator 133 may convert the plurality of digital sample signals into representative values at each clock delay value. For example, echo pulses having the same clock delay value may be converted into the plurality of digital sample signals through the analog-to-digital converter 132. The operator 133 may calculate the echo pulse converted into the plurality of digital sample signals to have representative values at each clock delay value.

The operator 133 may generate a scan vector from representative values at each clock delay value. In this case, the scan vector may be a set of representative values derived from echo pulses having different clock delay values, and may be data corresponding to one scan period. The scan vector generated by the operator 133 may be stored in the memory 140.

The operator 133 may generate a scan vector matrix from scan vectors corresponding to a plurality of scan periods. The operator 133 may generate a representative scan vector by calculating the scan vector matrix. The scan vector generated by the operator 133 may be stored in the memory 140.

For example, the operator 133 may generate a first scan vector corresponding to a first scan period and a second scan vector corresponding to a second scan period. The operator 133 may generate the scan vector matrix from the first scan vector and the second scan vector. The operator 133 may generate a representative scan vector by calculating the first scan vector and the second scan vector of the scan vector matrix. The representative scan vector generated by the operator 133 may be stored in the memory 140.

In some embodiments, the operator 133 may be implemented by hardware, software, or a combination of hardware and software. For example, some functions of the operator 133 may be implemented in software. At least some of the functions implemented in software may be stored as instructions in a non-transitory computer-readable medium. A processor of the pulse radar device 100 may cause the operator 133 of the receiver 130 to perform functions corresponding to the instructions by executing instructions stored in the non-transitory computer-readable medium. Alternatively, the processor of the receiver 130 may cause the operator 133 to perform functions corresponding to the instructions by executing instructions stored in the non-transitory computer-readable medium.

Figure 4:
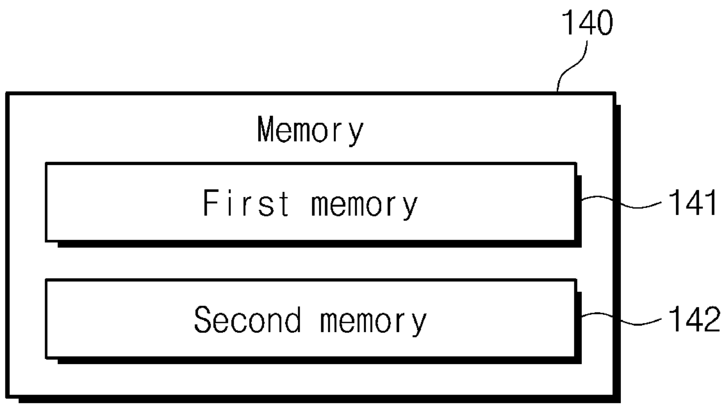
FIG. 4 is a block diagram illustrating a memory of FIG. 1.

FIG. 4 is a block diagram illustrating the memory 140 of FIG. 1. Referring to FIGS. 1, 3, and 4, the memory 140 may include a first memory 141 and a second memory 142.

The first memory 141 and the second memory 142 may each store one scan vector. The first memory 141 and the second memory 142 may sequentially store the scan vectors.

The first memory 141 and the second memory 142 may alternately operate in a write mode and a read mode, respectively. For example, while the first memory 141 operates in a write mode, the second memory 142 may operate in a read mode. Alternatively, while the second memory 142 operates in the write mode, the first memory 141 may operate in the read mode.

During the operation of the first memory 141 in the write mode and the second memory 142 in the read mode, the data for storage in the first memory 141 may consist of result data calculated by the operator 133 using the data stored in the second memory 142.

For example, the operator 133 may generate a first scan vector. The operator 133 may read scan vectors stored in the second memory 142 operating in the read mode. While the second memory 142 operates in the read mode, the operator 133 may obtain information about representative values at each clock delay value of the scan vectors stored in the second memory 142. Based on the information about the obtained representative values at each clock delay value, the operator 133 may generate the representative scan vector by calculating two scan vectors—the first scan vector and the scan vector stored in the second memory 142—. The operator 133 may store the generated representative scan vector in the first memory 141 operating in the write mode. In this case, the first memory 141 and the second memory 142 may use the same address value. When the first memory 141 is in an initial operation or when a read operation of the second memory 142 is performed by an external device, the operator 133 may not read data stored in the second memory 142.

When the second memory 142 operates in the write mode and the first memory 141 operates in the read mode, data to be stored in the second memory 142 may be result data calculated by the operator 133 based on the data stored in the first memory 141.

For example, the operator 133 may generate a second scan vector. The operator 133 may read scan vectors stored in the first memory 141 operating in the read mode. While the first memory 141 operates in the read mode, the operator 133 may obtain information about representative values at each clock delay value of the scan vectors stored in the first memory 141. Based on the information about the obtained representative values at each clock delay value, the operator 133 may calculate the second scan vector and the scan vector stored in the first memory 141 and may generate the representative scan vector. The operator 133 may store the generated representative scan vector in the second memory 142 operating in the write mode. In this case, the first memory 141 and the second memory 142 may use the same address value. When the second memory 142 is in an initial operation or when a read operation of the first memory 141 is performed by an external device, the operator 133 may not read data stored in the first memory 141.

As described above, through the read mode or write mode of each of the first memory 141 and the second memory 142, the memory 140 may store the latest scan vector (e.g., the representative scan vector). When the memory 140 stores the latest scan vector, the memory 140 may transmit the latest scan vector to the outside. In this case, the pulse radar device 100 may output a data transmission notification signal informing that calculation of the latest scan vector is completed to the outside to transmit the latest scan vector to the outside.

Figure 5:
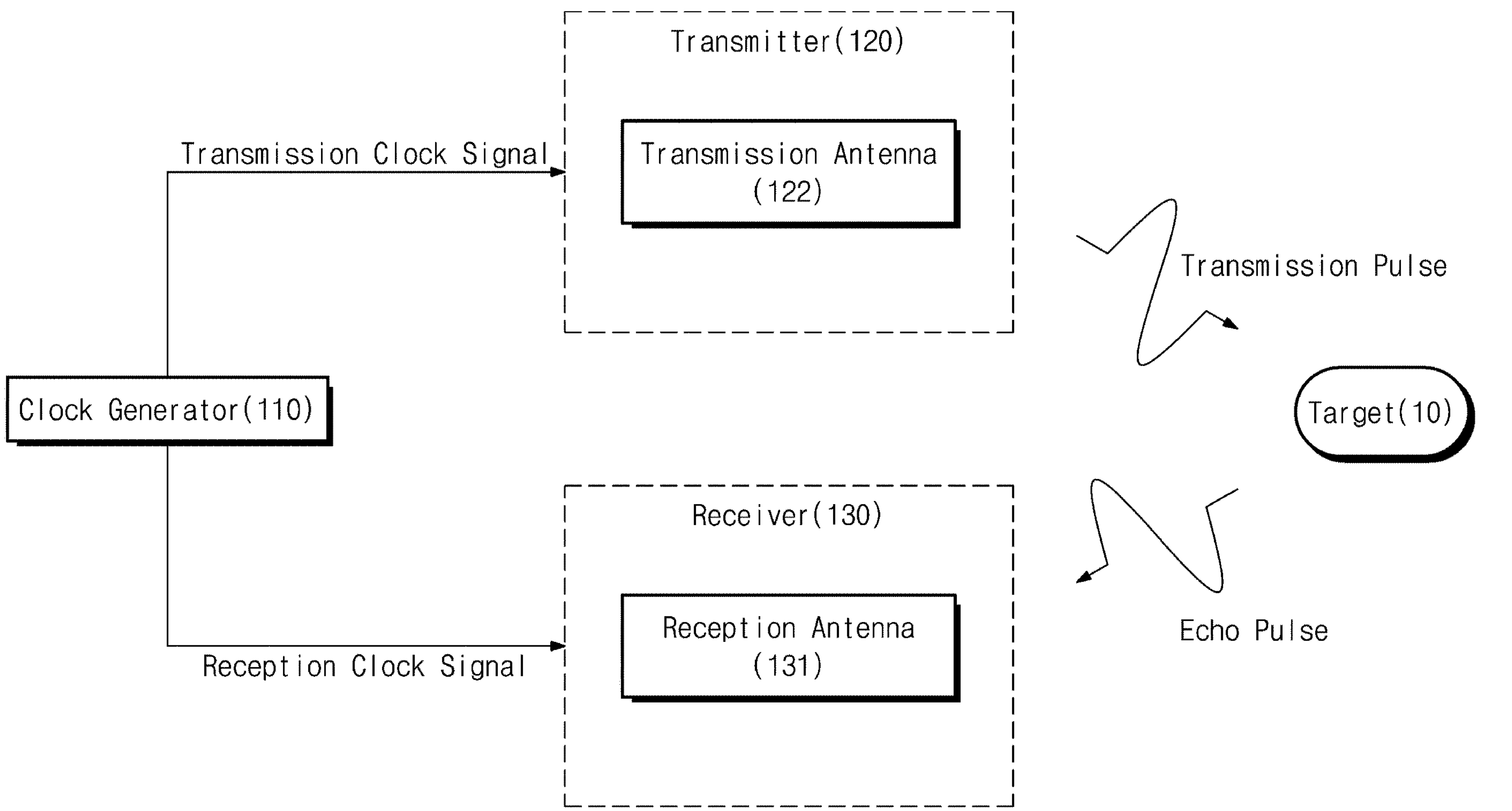
FIG. 5 illustrates a method of operating a pulse radar device, according to an embodiment of the present disclosure.

FIG. 5 illustrates a method of operating a pulse radar device, according to an embodiment of the present disclosure. Referring to FIGS. 1 to 3 and 5, the clock generator 110 may output the transmission clock signal to the transmitter 120.

The transmitter 120 may generate the transmission pulse based on the transmission clock signal received from the clock generator 110 and may radiate the transmission pulse to a target 10 through the transmission antenna 122.

The clock generator 110 may output the reception clock signal to the receiver 130 by delaying the transmission clock signal by a clock delay value after outputting the transmission clock signal. In this case, the clock generator 110 may output the reception clock signal by varying the clock delay value.

The receiver 130 may receive the echo pulse based on the reception clock signal. The receiver 130 may receive the echo pulse and may scan various scan distances according to a variable clock delay value.

The receiver 130 may process data by calculating the received echo pulse. By processing data, the receiver 130 may obtain information about the target 10.

Figure 6:
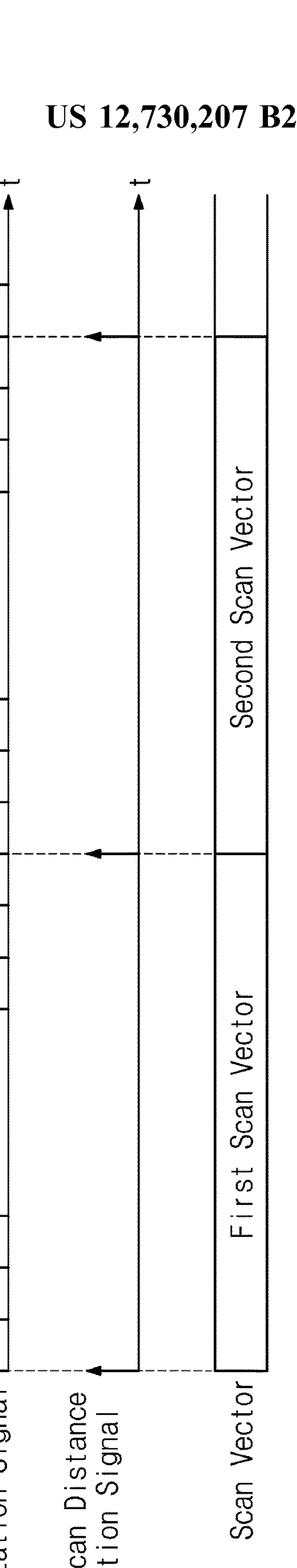
FIG. 6 is a timing diagram illustrating a clock delay of a pulse radar device, according to an embodiment of the present disclosure.

FIG. 6 is a timing diagram illustrating a clock delay of a pulse radar device, according to an embodiment of the present disclosure. Referring to FIGS. 1 to 3 and 6, a clock delay value may vary from a minimum clock delay value to a maximum clock delay value. For example, the clock delay value may increase from the minimum clock delay value to the maximum clock delay value. In this case, the clock delay value may increase by a clock delay increment value corresponding to the resolution of scan distance of the pulse radar device. The clock delay value may maintain the same clock delay value during the clock delay sustain period. When the pulse radar device 100 maintains the same clock delay value and subsequently increases the clock delay value by the clock delay increment value, the pulse radar device 100 may output an ADC synchronization signal to the analog to digital converter 132. The ADC synchronization signal may be a signal indicating a moment when the clock delay value changes.

When the clock delay value increases from the minimum clock delay value to reach the maximum clock delay value, the clock generator 110 may change the clock delay value to the minimum clock delay value. In this case, the pulse radar device 100 may output a minimum scan distance notification signal.

For example, the clock delay value may increase from the first minimum clock delay value to the first maximum clock delay value and then may become the second minimum clock delay value. When the clock delay value becomes the second minimum clock delay value, the pulse radar device 100 may output the minimum scan distance notification signal.

The time between the minimum scan distance notification signals may represent the scan period of the pulse radar device 100. In detail, the scan period of the pulse radar device 100 may represent the time required to reach the minimum clock delay value again after the clock delay value increases from the minimum clock delay value to reach the maximum clock delay value.

The pulse radar device 100 may repeatedly scan the distance to the target. For example, the pulse radar device 100 may scan a minimum scan distance to a maximum scan distance during a first scan period, and then repeatedly scan the minimum scan distance to the maximum scan distance during a second scan period.

The pulse radar device 100 may generate a scan vector corresponding to a scan period. For example, the pulse radar device 100 may generate the first scan vector corresponding to the first scan period and the second scan vector corresponding to the second scan period.

Figure 7:
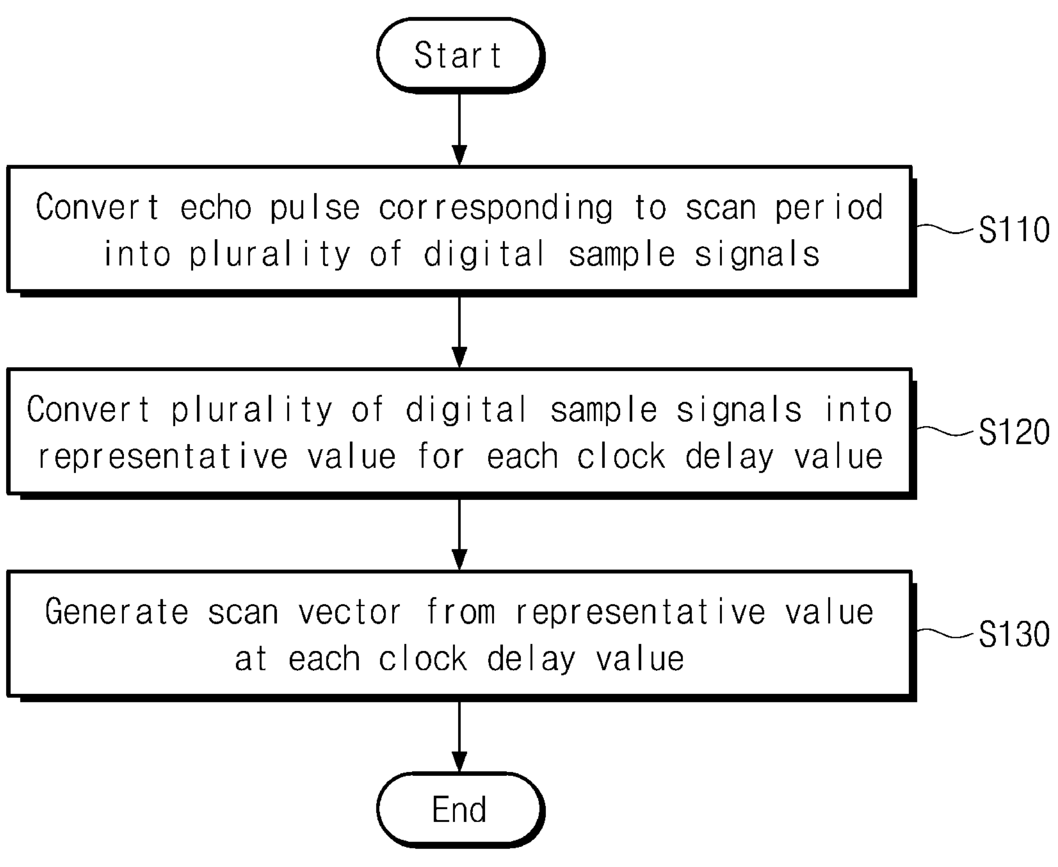
FIG. 7 is a flowchart illustrating a method of operating a pulse radar device, according to an embodiment of the present disclosure.

FIG. 7 is a flowchart illustrating a method of operating a pulse radar device, according to an embodiment of the present disclosure. Referring to FIGS. 6 and 7, in operation S110, the pulse radar device may convert the echo pulse corresponding to the scan period into a plurality of digital sample signals. For example, the pulse radar device may convert echo pulses having the same clock delay value into digital sample signals.

In operation S120, the pulse radar device may convert the plurality of digital sample signals into representative values at each clock delay value. The pulse radar device may convert the plurality of digital sample signals into representative values at each clock delay value so as to have the representative values at each clock delay value.

For example, the pulse radar device may convert the plurality of digital sample signals into the representative values at each clock delay value based on an accumulated value of the plurality of digital sample signals corresponding to the same clock delay value.

For example, the pulse radar device may convert the plurality of digital sample signals into the representative values at each clock delay value based on an average value of the plurality of digital sample signals corresponding to the same clock delay value.

In operation S130, the pulse radar device may generate a scan vector from the representative values at each clock delay value. For example, the pulse radar device may generate a scan vector corresponding to one scan period from the representative values at each clock delay value.

Figure 8A:
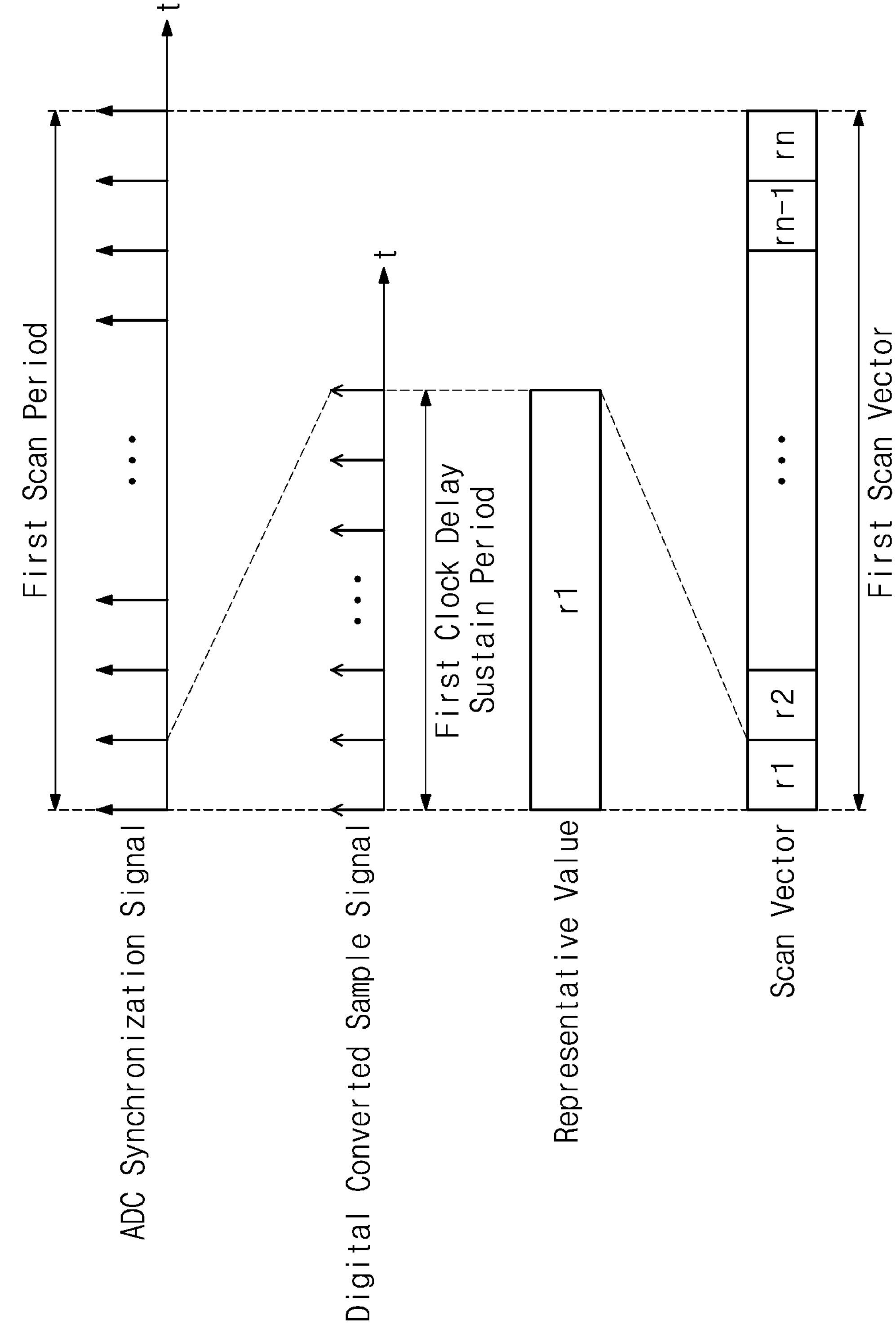

FIGS. 8A and 8B illustrate a process of generating a scan vector, according to an embodiment of the present disclosure. Referring to FIGS. 6 to 8B, the pulse radar device may convert echo pulses having the same clock delay value into a plurality of digital sample signals and may convert the plurality of digital sample signals into representative values.

In FIG. 8A, the echo pulse may have one representative value for each of the same clock delay value. For example, the echo pulse during the first clock delay sustain period may be converted into the plurality of digital sample signals. The plurality of digital sample signals may be converted into a first representative value r1. In this way, the echo pulse corresponding to the first scan period may be converted into the first representative value r1 to an rn-th representative value ('n' is a natural number). The pulse radar device may generate the first scan vector from the first representative value r1 to the rn-th representative value.

In FIG. 8B, the echo pulse may have two representative values for each of the same clock delay value. For example, the echo pulse during the first clock delay sustain period may be converted into the plurality of digital sample signals. The plurality of digital sample signals may be converted into a representative value r11 and a representative value r12. In this way, the echo pulse corresponding to the first scan period may be converted into the representative value r11, the representative value r12, . . . , a representative value rn1, and a representative value rn2. The pulse radar device may generate the first scan vector from the representative value r11, the representative value r12, . . . , the representative value rn1, and the representative value rn2.

Figure 9:
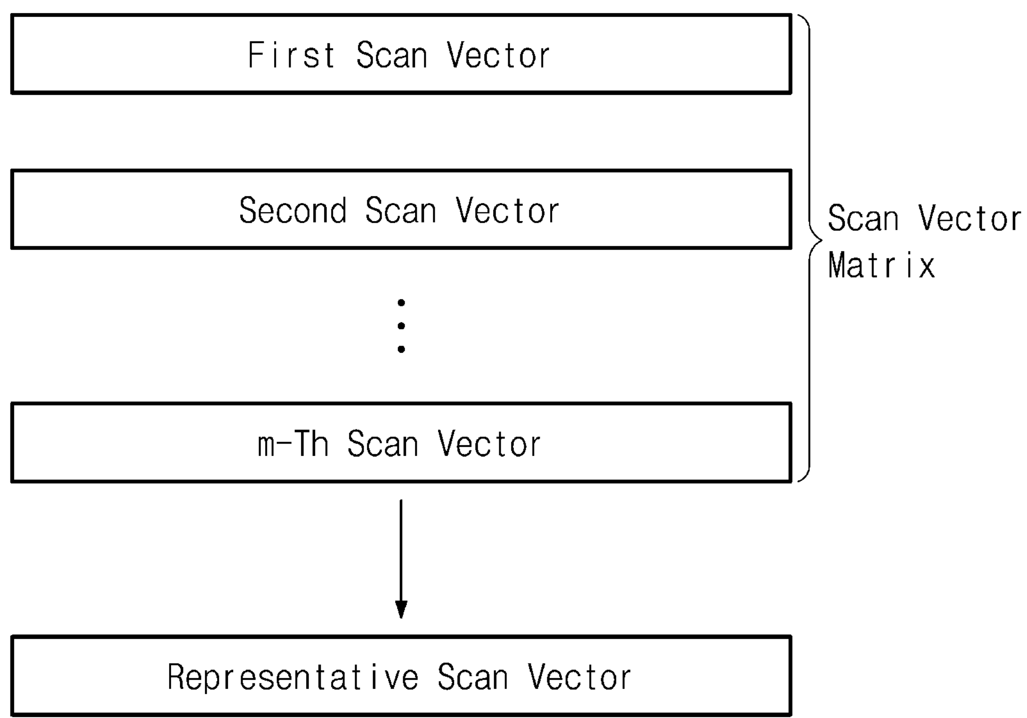
FIG. 9 illustrates a representative scan vector calculation process, according to an embodiment of the present disclosure.

FIG. 9 illustrates a representative scan vector calculation process, according to an embodiment of the present disclosure. Referring to FIGS. 6 to 9, when the pulse radar device scans from the first scan period to an m-th scan period ('m' is a natural number), the pulse radar device may generate a first scan vector to an m-th scan vector. The pulse radar device may generate a scan vector matrix from the first to m-th scan vectors. The pulse radar device may generate one representative scan vector by calculating the scan vector matrix.

For example, the pulse radar device may generate the representative scan vector by calculating accumulated values from the first to m-th scan vectors (e.g., by adding the first to m-th scan vectors).

For example, the pulse radar device may generate the representative scan vector by calculating average value from the first to m-th scan vectors.

For example, the pulse radar device may generate the representative scan vector by calculating a difference between the m-th scan vector and the average value from the first to m−1 th scan vectors.

Figure 10:
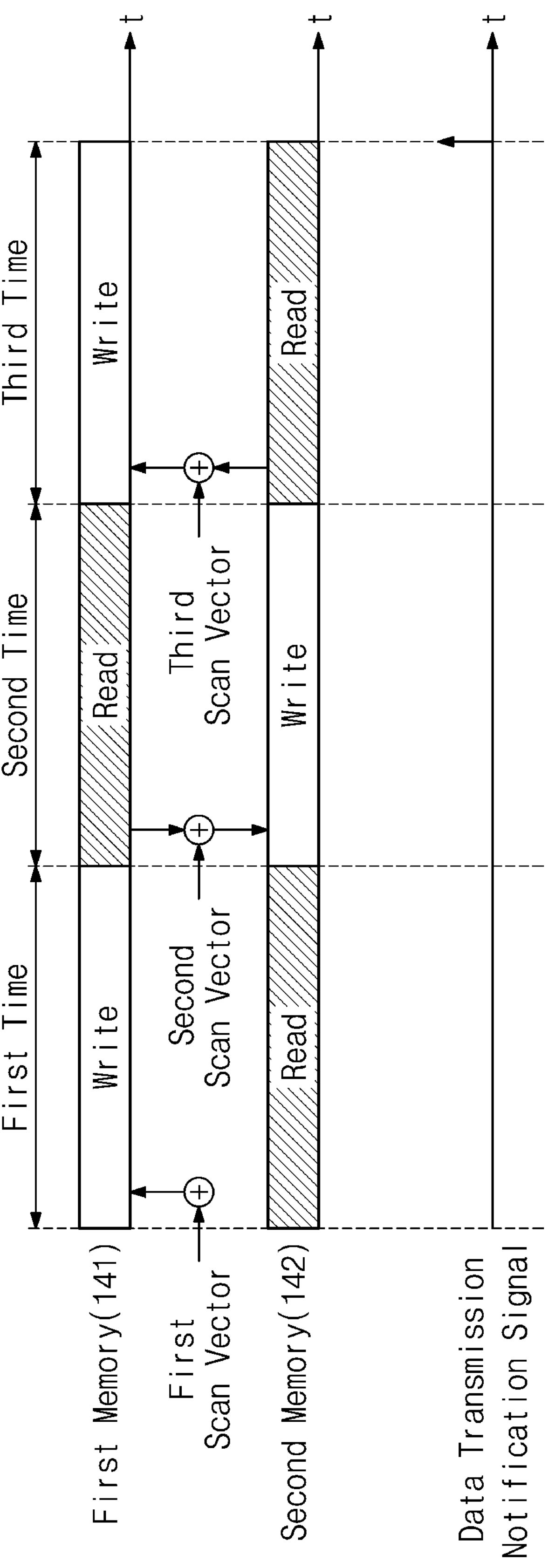
FIG. 10 illustrates a process of calculating a representative scan vector, according to an embodiment of the present disclosure.

FIG. 10 illustrates a process of calculating a representative scan vector, according to an embodiment of the present disclosure. In FIG. 10, each of the first to third times may correspond to a scan period of the pulse radar device. In FIG. 10, the pulse radar device scans from the first scan period to the third scan period. The pulse radar device generates first scan vectors to third scan vectors, and generates a scan vector matrix from the first scan vector to the third scan vector.

Referring to FIGS. 3, 4, and 6 to 10, during a first time, the first memory 141 may operate in a write mode, and the second memory 142 may operate in a read mode. During a second time, the first memory 141 may operate in a read mode, and the second memory 142 may operate in a write mode. During a third time, the first memory 141 may operate in a write mode, and the second memory 142 may operate in a read mode.

During the first time, the first memory 141 may operate in a write mode and may store the first scan vector of the scan vector matrix. In this case, since the first memory 141 and the second memory 142 are initially operated, the operator 133 may not read data from the second memory 142.

During the second time, the first memory 141 may operate in a read mode, and the second memory 142 may operate in a write mode. The operator 133 may calculate the first scan vector stored in the first memory 141 and the second scan vector of the scan vector matrix. Subsequently, the operator 133 may store the first representative scan vector, which is the result of the calculation, in the second memory 142.

For example, the operator 133 may calculate an accumulated value of the first scan vector stored in the first memory 141 and the second scan vector of the scan vector matrix. The operator 133 may calculate the accumulated value by adding the first scan vector and the second scan vector. Subsequently, the operator 133 may store the first representative scan vector, which is the result of the calculation, in the second memory 142.

For example, the operator 133 may calculate an average value of the first scan vector stored in the first memory 141 and the second scan vector of the scan vector matrix. Subsequently, the operator 133 may store the first representative scan vector, which is the result of the calculation, in the second memory 142.

During the third time, the first memory 141 may operate in a write mode, and the second memory 142 may operate in a read mode. The operator 133 may calculate the first representative scan vector stored in the second memory 142 and the third scan vector of the scan vector matrix. Subsequently, the operator 133 may store the second representative scan vector, which is the result of the calculation, in the first memory 141.

For example, the operator 133 may calculate an accumulated value of the first representative scan vector stored in the second memory 142 and the third scan vector of the scan vector matrix. The operator 133 may calculate the accumulated value by adding the first representative scan vector and the third representative scan vector. Subsequently, the operator 133 may store the second representative scan vector, which is the result of the calculation, in the first memory 141.

For example, the operator 133 may calculate an average value of the first representative scan vector stored in the second memory 142 and the third scan vector of the scan vector matrix. Subsequently, the operator 133 may store the second representative scan vector, which is the result of the calculation, in the first memory 141.

For example, the operator 133 may calculate a difference between an average value of the first and second scan vectors and the third scan vector of the scan vector matrix. Subsequently, the operator 133 may store the second representative scan vector, which is the result of the calculation, in the first memory 141.

The pulse radar device may transmit the second representative scan vector stored in the first memory 141 to the outside. In this case, the pulse radar device may externally output a data transmission notification signal to inform that the process of generating the second representative scan vector has been completed allowing for the transmission the second representative scan vector to the outside.

As described above, the memory 140 may store the latest representative scan vector by utilizing the read mode or write mode of each of the first memory 141 and the second memory 142.

Figure 11:
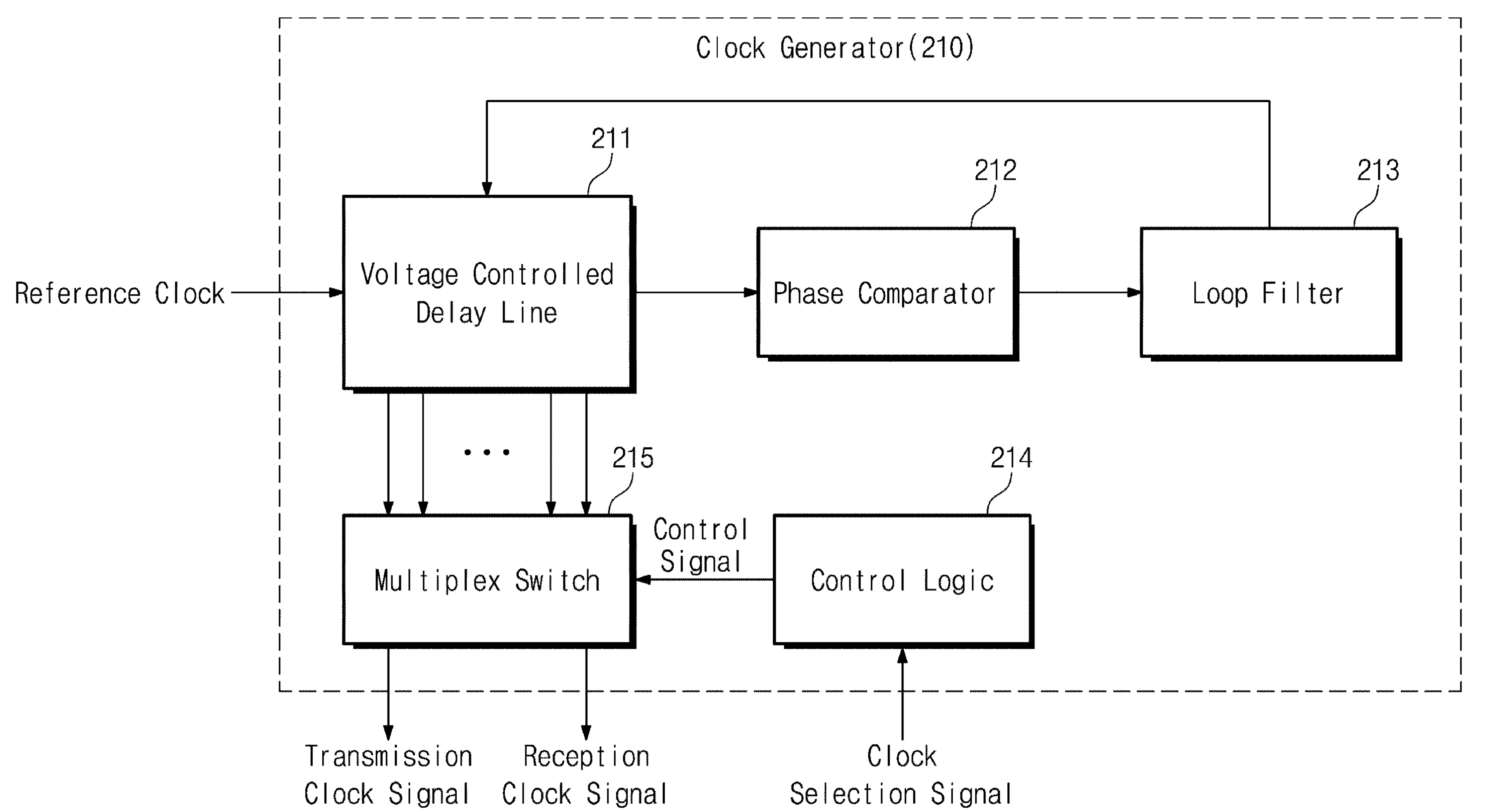
FIG. 11 illustrates a clock generator, according to an embodiment of the present disclosure.

FIG. 11 illustrates a clock generator 210, according to an embodiment of the present disclosure. Referring to FIG. 11, the clock generator 210 may be implemented with a delay locked loop (DLL). The clock generator 210 may include a voltage controlled delay line (VCDL) 211, a phase comparator 212, a loop filter 213, control logic 214, and a multiplex switch 215.

The voltage controlled delay line 211 may include a plurality of voltage controlled delay elements. The plurality of voltage controlled delay elements may constitute a multi-stage voltage controlled delay element.

The voltage controlled delay line 211 may accept a reference clock from the outside and may be controlled by a direct current (DC) voltage from the loop filter 213. The voltage controlled delay line 211 may operate based on the DC voltage applied from the loop filter 213. An output of the voltage controlled delay line 211 may be an output of each stage of the multi-stage voltage controlled delay element driven by the reference clock.

The phase comparator 212 may output a pulse voltage proportional to a phase difference between signals input to the phase comparator 212.

The loop filter 213 may include a capacitor. The loop filter 213 may convert the pulse voltage output from the phase comparator 212 into a DC voltage. For example, the loop filter 213 may remove high-frequency components of the pulse voltage to convert the pulse voltage into a DC voltage. The loop filter 213 may apply the converted DC voltage to the voltage controlled delay line 211.

The control logic 214 may receive a clock selection signal from the outside. The control logic 224 may output a control signal based on the clock selection signal. The control signal may be a signal for controlling the multiplex switch 215.

The multiplex switch 215 may select a transmission clock signal and a reception clock signal among multiple clock signals received from the voltage controlled delay line 211. For example, the multiplex switch 215 may operate based on a control signal received from the control logic 214. The multiplex switch 215 may select a transmission clock signal and a reception clock signal from among various delay clock signals of the voltage controlled delay line 211.

Figure 12:
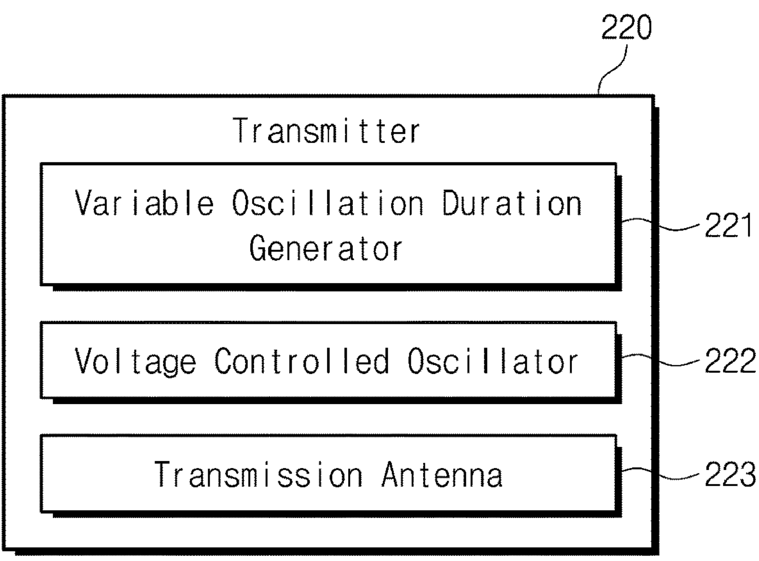
FIG. 12 illustrates a transmitter, according to an embodiment of the present disclosure.

FIG. 12 illustrates a transmitter, according to an embodiment of the present disclosure. Referring to FIGS. 1, 2, and 12, a transmitter 220 may include a variable oscillation duration generator 221, a voltage controlled oscillator 222, and a transmission antenna 223.

The transmission antenna 223 is the same as that described with reference to FIG. 2. Therefore, additional descriptions will be omitted to avoid redundancy.

The variable oscillation duration generator 221 may accept the transmission clock signal from the clock generator 110 to generate a variable oscillation duration, which is defined from an edge of the clock signal.

The voltage controlled oscillator 222 may generate a transmission pulse that oscillates for a time corresponding to a variable oscillation duration.

Figure 13:
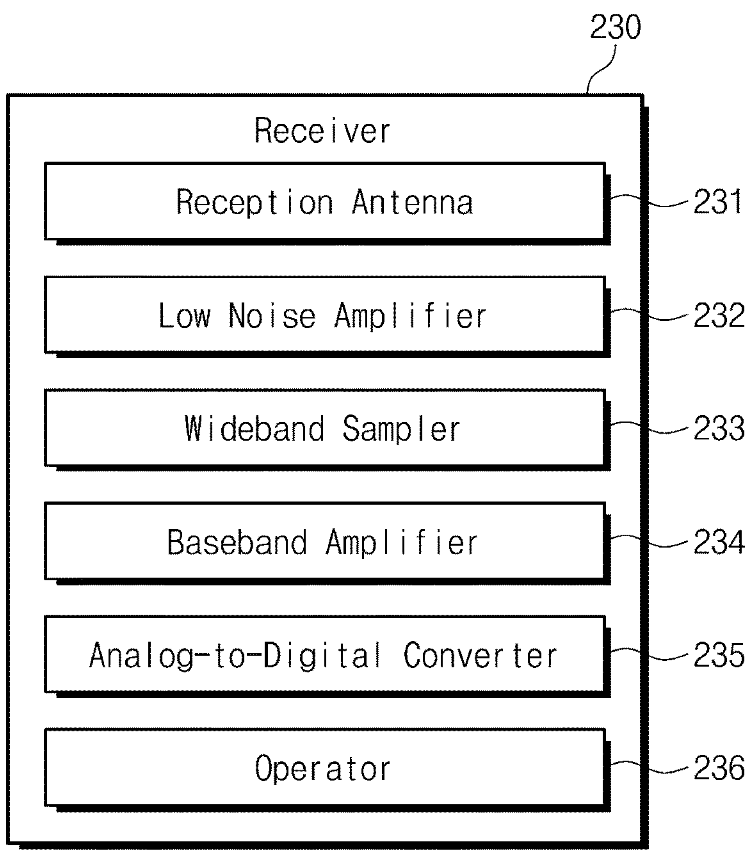
FIG. 13 illustrates a receiver, according to an embodiment of the present disclosure.

FIG. 13 illustrates a receiver 230 according to an embodiment of the present disclosure. Referring to FIGS. 1, 3 and 13, the receiver 230 may include a reception antenna 231, a low noise amplifier 232, a wideband sampler 233, a baseband amplifier 234, an analog-to-digital converter 235, and an operator 236.

The analog-to-digital converter 235 and the operator 236 are the same as those described with reference to FIG. 3. Therefore, additional descriptions will be omitted to avoid redundancy.

The reception antenna 231 may receive the echo pulse reflected from a target.

The low noise amplifier 232 may be connected to the reception antenna 231. The low noise amplifier 232 may receive noise of the echo pulse received by the reception antenna 231 with low noise. In detail, the low noise amplifier 232 may amplify the echo pulse received by the reception antenna 231 with low noise.

The wideband sampler 233 may be connected with the low noise amplifier 232. The wideband sampler 233 may accept the reception clock signal from the clock generator 110 to sample the output of the low noise amplifier 232.

The baseband amplifier 234 may amplify the signal sampled from the wideband sampler 233.

The analog-to-digital converter 235 may convert output-signals of the baseband amplifier 234 into digital sample signals.

As described above, the receiver 230 may be implemented as an integrated circuit.

FIG. 14 is a block diagram illustrating a computing device 1000 according to an embodiment of the present disclosure. Referring to FIG. 14, the computing device 1000 may include a processor 310, a main memory 320, a pulse radar device 330, a device manager 340, a storage device 350, a signal processor 360, and a modem 370.

The processor 310 may execute an operating system operating the computing device 1000 and various commands and codes. The processor 310 may include an application processor (AP) or a central processing unit (CPU).

The main memory 320 may be a working memory of the processor 310. The main memory 320 may include a dynamic random access memory (DRAM) or a storage class memory (SCM).

The pulse radar device 330 may include the pulse radar device 100 according to an embodiment of the present disclosure. The pulse radar device 330 may be an auxiliary processor configured to perform the operations, methods, or processes described with reference to FIGS. 1 to 13.

The device manager 340 may connect the processor 310 with peripheral devices of the computing device 1000. For example, the device manager 340 may connect the storage device 350, the signal processor 360, and the modem 370 to the processor 310.

The storage device 350 may be a secondary storage device of the computing device 1000. The storage device 350 may include a hard disk drive (HDD), a solid state drive (SSD), an optical disk drive (ODD), and a removable memory card such as a USB memory.

The signal processor 360 may operate by receiving a data transmission notification signal of the pulse radar device 330. The signal processor 360 may read the representative scan vector stored in the memory of the pulse radar device 330 using a rising edge of the data transmission notification signal as a reference signal. The signal processor 360 may perform signal processing on the representative scan vector until the next data transmission notification signal is received.

For example, the signal processor 360 may obtain various information about the target, such as motion and speed of the target, from the representative scan vector.

The signal processor 360 may transmit a reference clock and a clock selection signal to the pulse radar device 330. The clock generator of the pulse radar device 330 may operate by accepting the reference clock and the clock selection signal.

The modem 370 may be configured to communicate with an external device. For example, the modem 370 may communicate the scan vector with an external device. A scan vector obtained by the modem 370 may be stored in the main memory 320.

In the above embodiments, components according to the present disclosure are described by using the terms “first”, “second”, “third”, and the like. However, the terms “first”, “second”, “third”, and the like may be used to distinguish components from each other and do not limit the present disclosure. For example, the terms “first”, “second”, “third”, and the like do not involve an order or a numerical meaning of any form.

In the above embodiments, components according to embodiments of the present disclosure are described by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. In addition, the blocks may include circuits composed of semiconductor devices in the IC or circuits registered as an IP (Intellectual Property).

According to an embodiment of the present disclosure, the pulse radar device may efficiently process data when an echo pulse is received. In detail, by digitally converting and processing the echo pulse, information on the target of the echo pulse may be preserved and the amount of data to be received may be reduced. Therefore, it is possible to configure the hardware efficiently.

According to an embodiment of the present disclosure, the pulse radar device may increase the signal-to-noise ratio (SNR) of the echo pulse.

The above description refers to embodiments for implementing the scope of the present disclosure. Embodiments in which a design is changed simply or which are easily changed may be included in the scope of the present disclosure as well as an embodiment described above. In addition, technologies that are easily changed and implemented by using the above-mentioned embodiments may be also included in the scope of the present disclosure.

What is claimed is:

1. A pulse radar device comprising:

a clock generator configured to output a transmission clock signal, and to output a reception clock signal by delaying the transmission clock signal by a clock delay value;

a transmitter configured to generate and radiate a transmission pulse based on the transmission clock signal;

a memory including:

a first memory configured to store a previously generated scan vector and to operate in a read mode during a current scan period; and a second memory configured to store a representative scan vector and to operate in a write mode during the current scan period; and a receiver configured to accept the reception clock signal from the clock generator, to receive echo pulses reflected from a target through a reception antenna based on the reception clock signal;

wherein the receiver comprises an operator configured to:

while receiving echo pulses corresponding to a current scan period, reference the scan vector stored in the first memory operating in the read mode, perform a computation using the referenced scan vector and data derived from the received echo pulses before completion of storage of the received echo pulses, and store a result of the computation as the representative scan vector in the second memory operating in the write mode, wherein the first memory and the second memory use identical address values, and wherein, in a subsequent scan period, the second memory operates in the read mode and the first memory operates in the write mode by exchanging operational roles of the first memory and the second memory.

2. The pulse radar device of claim 1, wherein a data transmission notification signal indicating completion of an operation of generating the representative scan vector is output to transmit the representative scan vector to an external device.

3. The pulse radar device of claim 1, wherein the clock delay value increases from a first minimum clock delay value to a maximum clock delay value.

4. The pulse radar device of claim 3, wherein a scan period of the pulse radar device represents a time required to reach the minimum clock delay value again after the clock delay value increases from the minimum clock delay value to reach the maximum clock delay value.

5. The pulse radar device of claim 1, wherein the clock generator includes:

a voltage-controlled delay line configured to receive a reference clock and output a plurality of clock signals;

a phase comparator configured to output a pulse voltage proportional to a phase difference between input signals;

a loop filter configured to convert the pulse voltage into a DC voltage and apply the DC voltage to the voltage-controlled delay line;

control logic configured to receive a clock selection signal to output a control signal; and a multiplex switch configured to select the transmission clock signal and the reception clock signal among the plurality of clock signals based on the control signal, wherein the voltage-controlled delay line, the phase comparator, and the loop filter form a feedback circuit.

6. The pulse radar device of claim 1, wherein the transmitter further includes:

a variable oscillation duration generator configured to generate a variable oscillation duration by accepting the transmission clock signal; and a voltage-controlled oscillator configured to generate the transmission pulse oscillating during the variable oscillation duration.

7. The pulse radar device of claim 1, wherein the receiver further includes:

a low-noise amplifier configured to receive the echo pulses with reduced noise;

a wideband sampler configured to accept the reception clock signal to sample output signals of the low-noise amplifier; and a baseband amplifier configured to amplify signals sampled by the wideband sampler, and wherein the receiver is implemented as an integrated circuit.

8. An operating method of a pulse radar device including a first memory and a second memory each storing at least one scan vector, the operating method comprising:

radiating a transmission pulse toward a target based on a transmission clock signal;

receiving echo pulses reflected from the target based on a reception antenna based on a reception clock signal obtained by delaying the transmission clock signal by a clock delay value; and during a current scan period, generating a representative scan vector by:

referencing a scan vector stored in one of the first memory and the second memory operating in a read mode, calculating the representative scan vector based on the referenced scan vector and data derived from the received echo pulses corresponding to the current scan period, and storing the representative scan vector in another of the first memory and the second memory operating in a write mode, wherein, in a subsequent scan period, operational roles of the first memory and the second memory are exchanged.

9. The operating method of claim 8, wherein, during a current scan period, generating the representative scan vector from the at least one scan vector includes:

generating a scan vector matrix from the at least one scan vector stored in the first memory or the second memory; and generating the representative scan vector by calculating the scan vector matrix.

10. The operating method of claim 8, during a current scan period, generating a representative scan vector including:

converting echo pulses into a plurality of digital sample signals;

converting the plurality of digital sample signals into representative values for each of clock delay values;

generating the at least one scan vector from the representative values for each of the clock delay values; and generating the representative scan vector from the at least one scan vector, wherein converting the plurality of digital sample signals into the representative values for each of the clock delay values includes converting the plurality of digital sample signals into the representative values based on an accumulated value of digital sample signals corresponding to a same clock delay value.

11. The operating method of claim 8, during a current scan period, generating a representative scan vector including:

converting echo pulses into a plurality of digital sample signals;

converting the plurality of digital sample signals into representative values for each of clock delay values;

generating at least one scan vector from the representative values for each of the clock delay values; and generating the representative scan vector from the at least one scan vector, wherein converting the plurality of digital sample signals into the representative values for each of the clock delay values includes converting the plurality of digital sample signals into the representative values based on an average value of digital sample signals corresponding to a same clock delay value.

* * * * *